H. E. SCHNABEL.
MACHINE FOR MAKING WIRE POSTS, &c.
APPLICATION FILED NOV. 8, 1907.
937,474.
Patented Oct. 19, 1909.
10 SHEETS—SHEET 1.
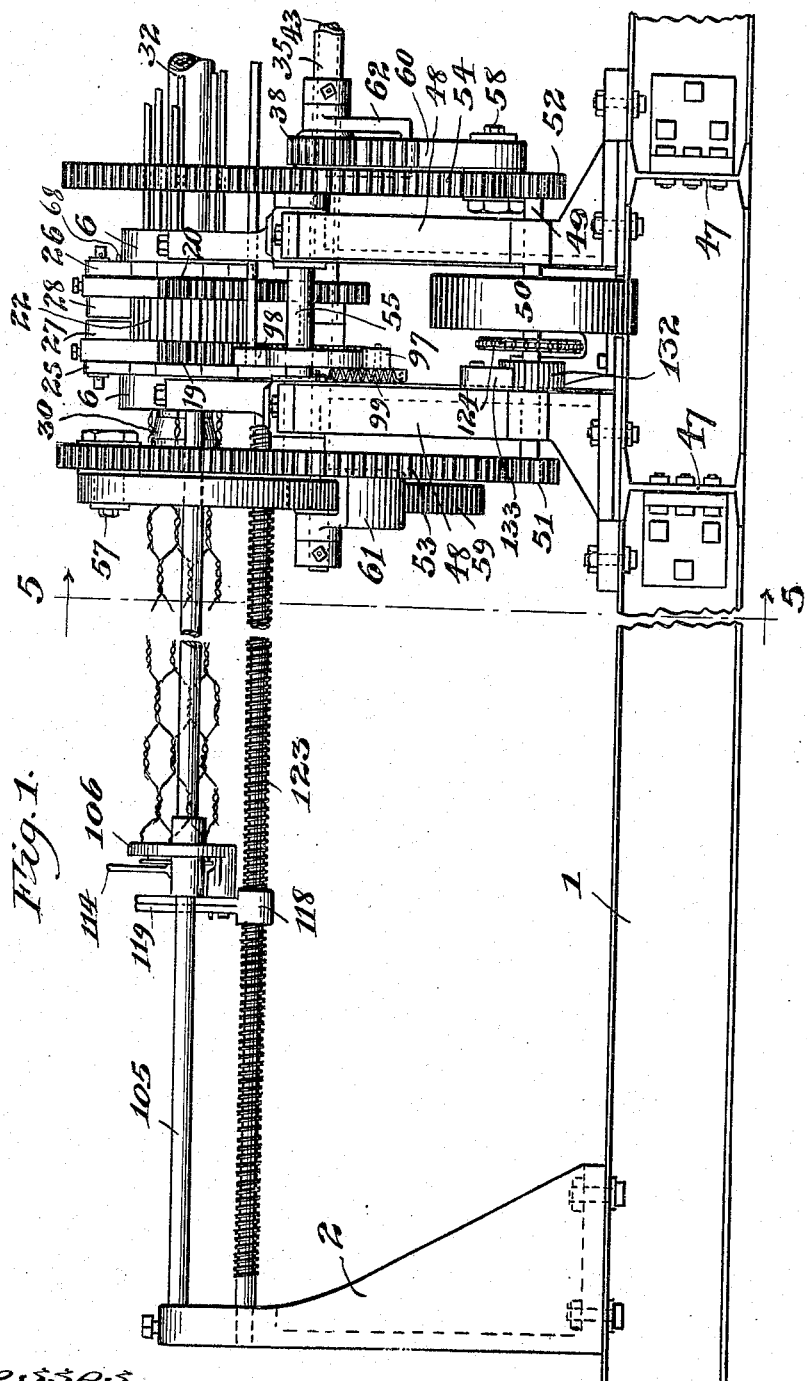

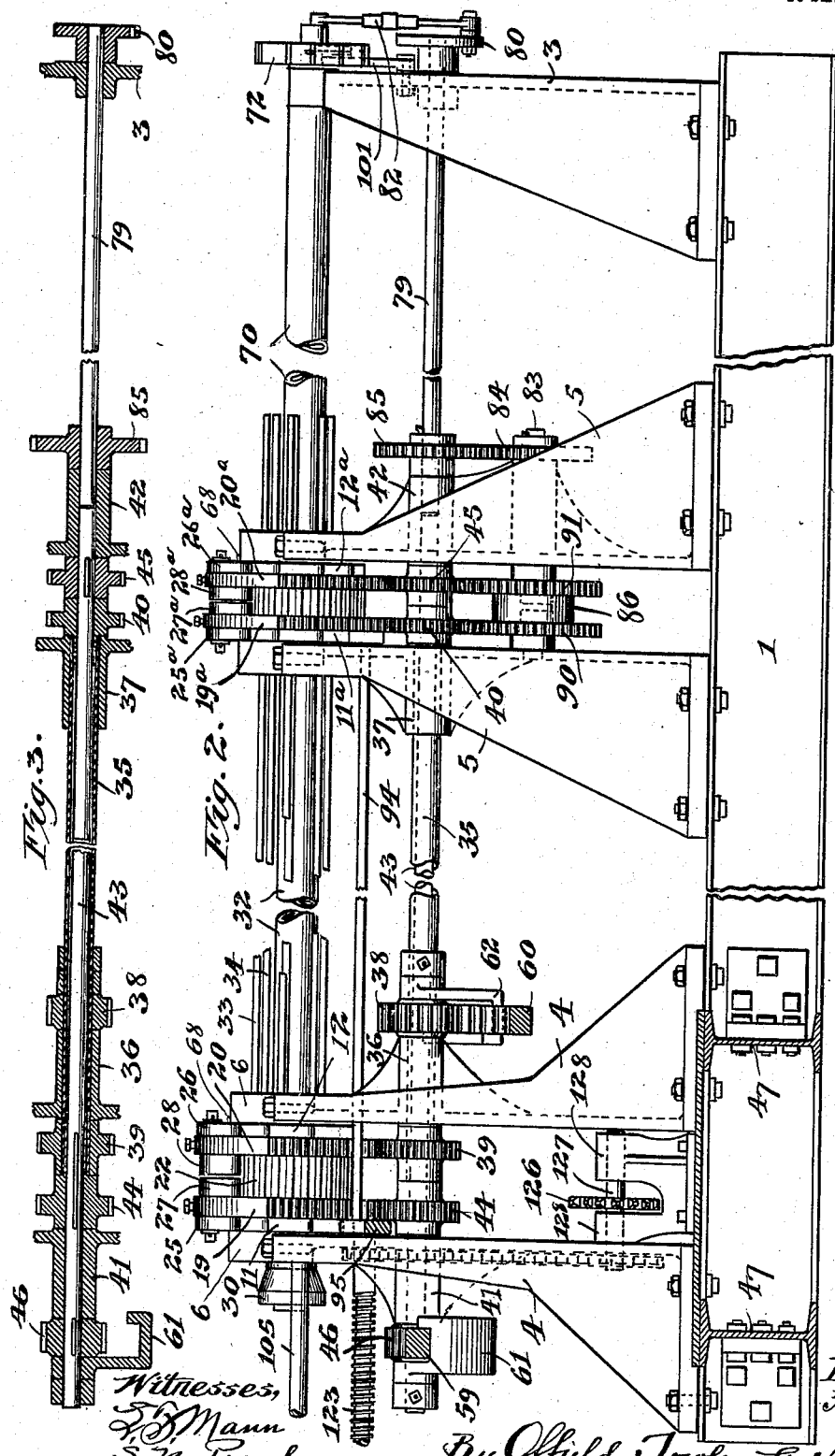

H. E. SCHNABEL.
MACHINE FOR MAKING WIRE POSTS, &c.
APPLICATION FILED NOV. 8, 1907.
937,474.
Patented Oct. 19, 1909.
10 SHEETS—SHEET 3.
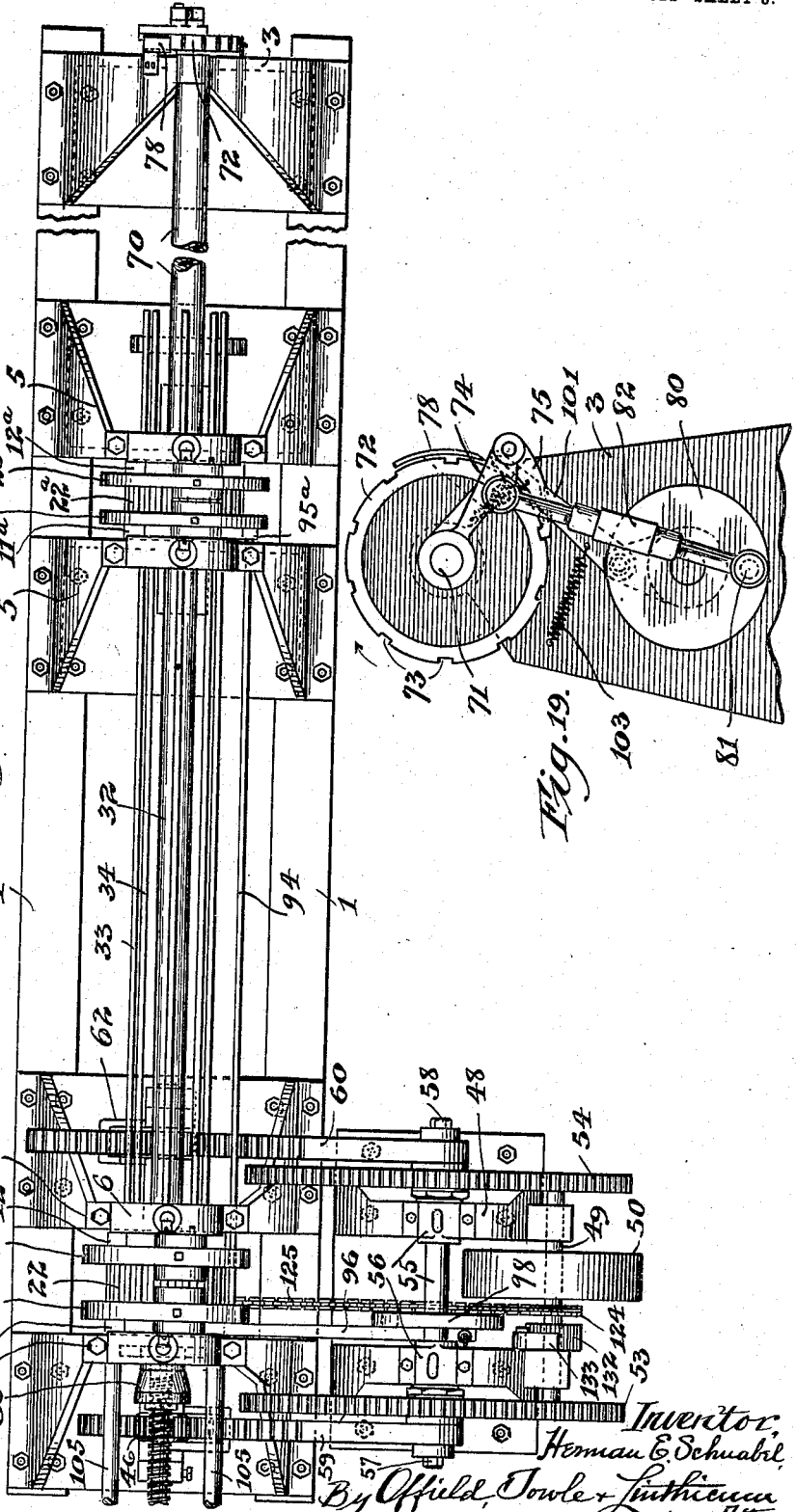

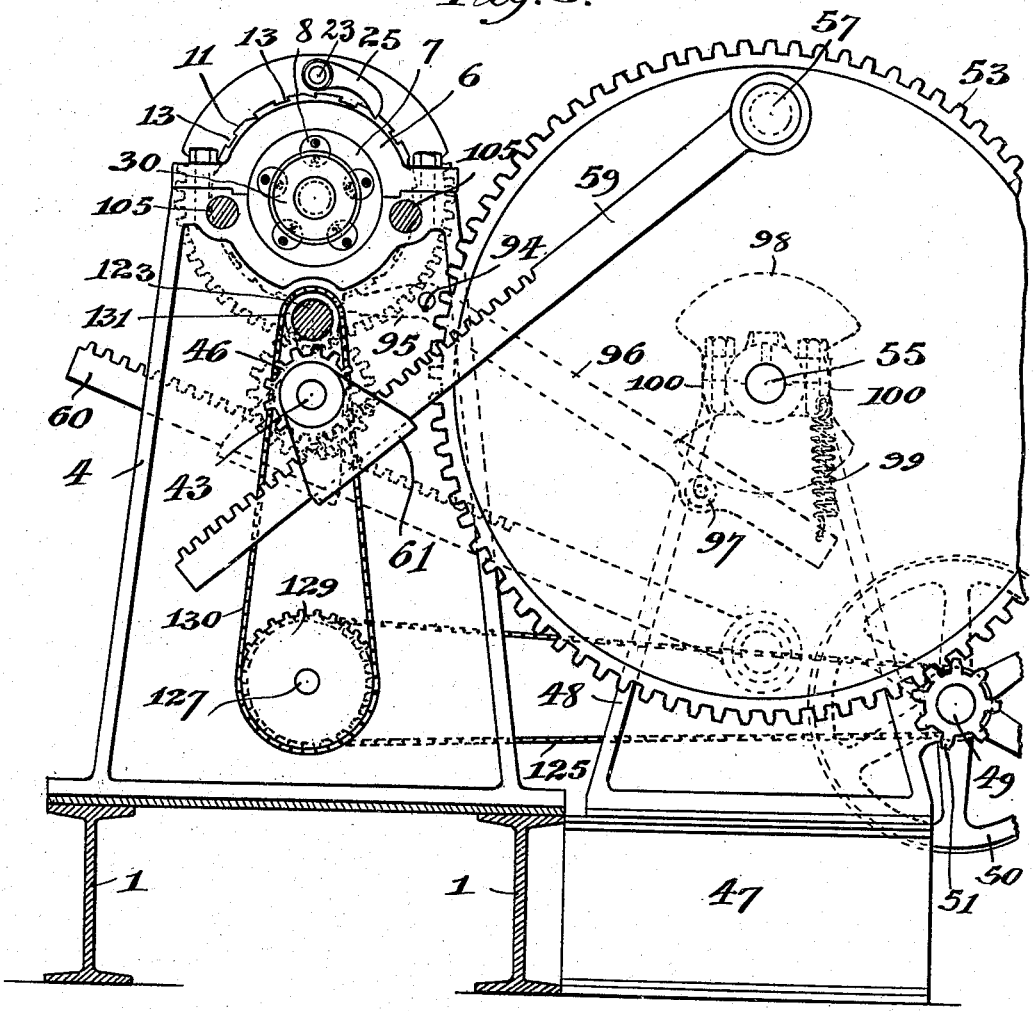

H. E. SCHNABEL.
MACHINE FOR MAKING WIRE POSTS, &c.
APPLICATION FILED NOV. 8, 1907.
937,474.
Patented Oct. 19, 1909.
10 SHEETS—SHEET 5.
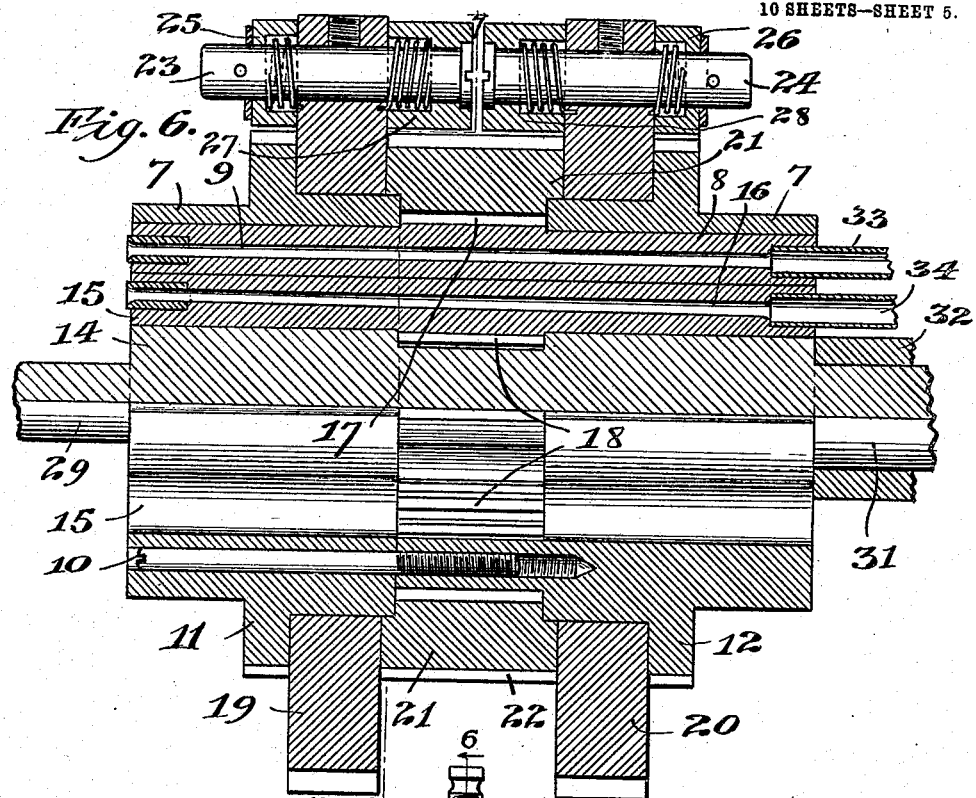
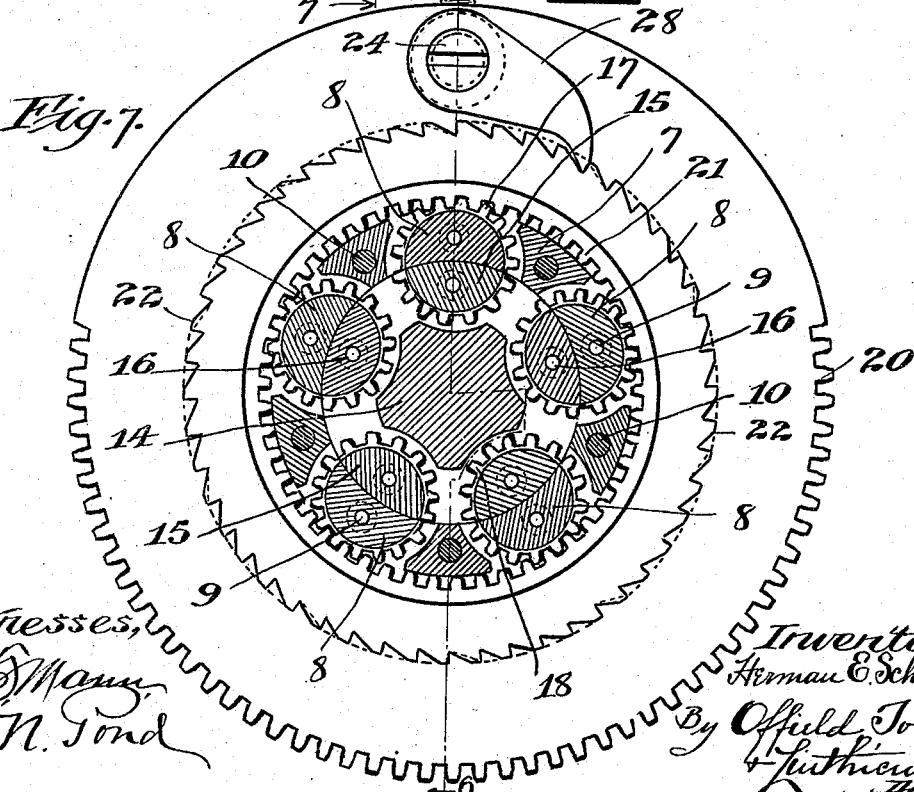

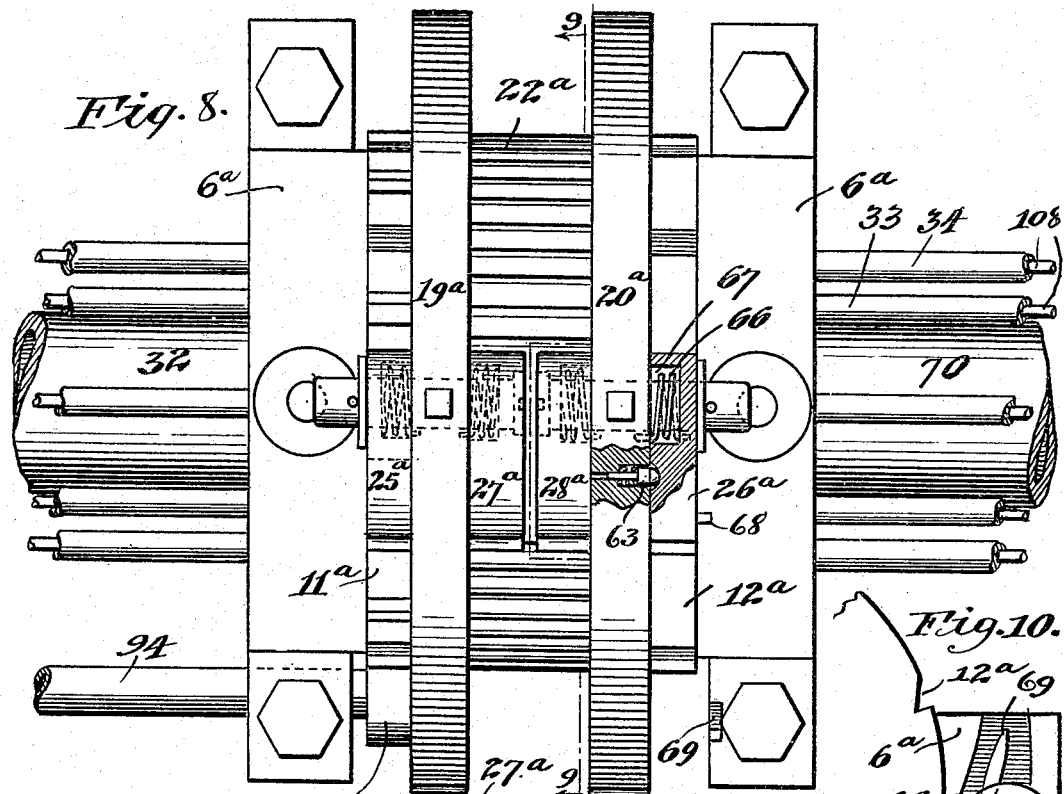
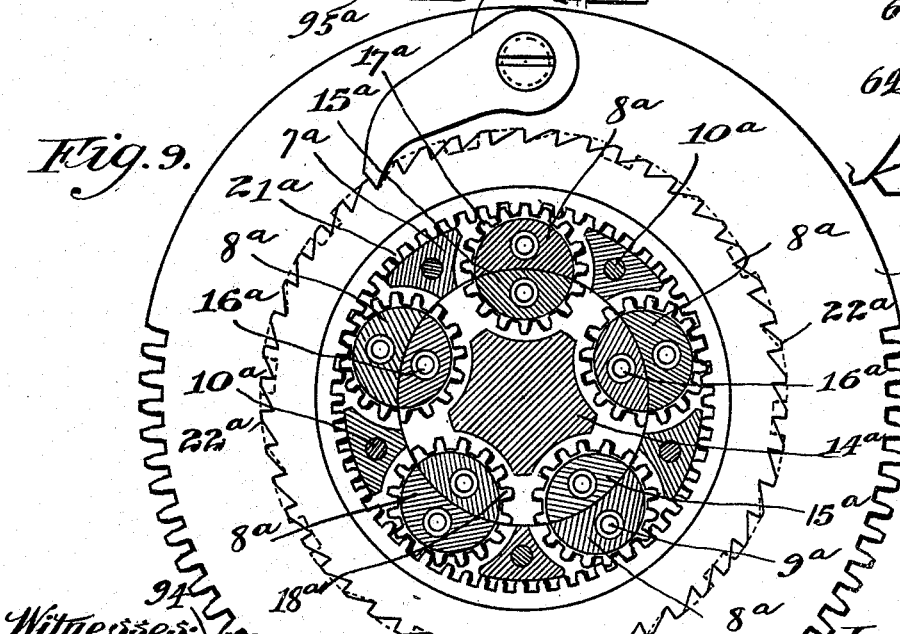

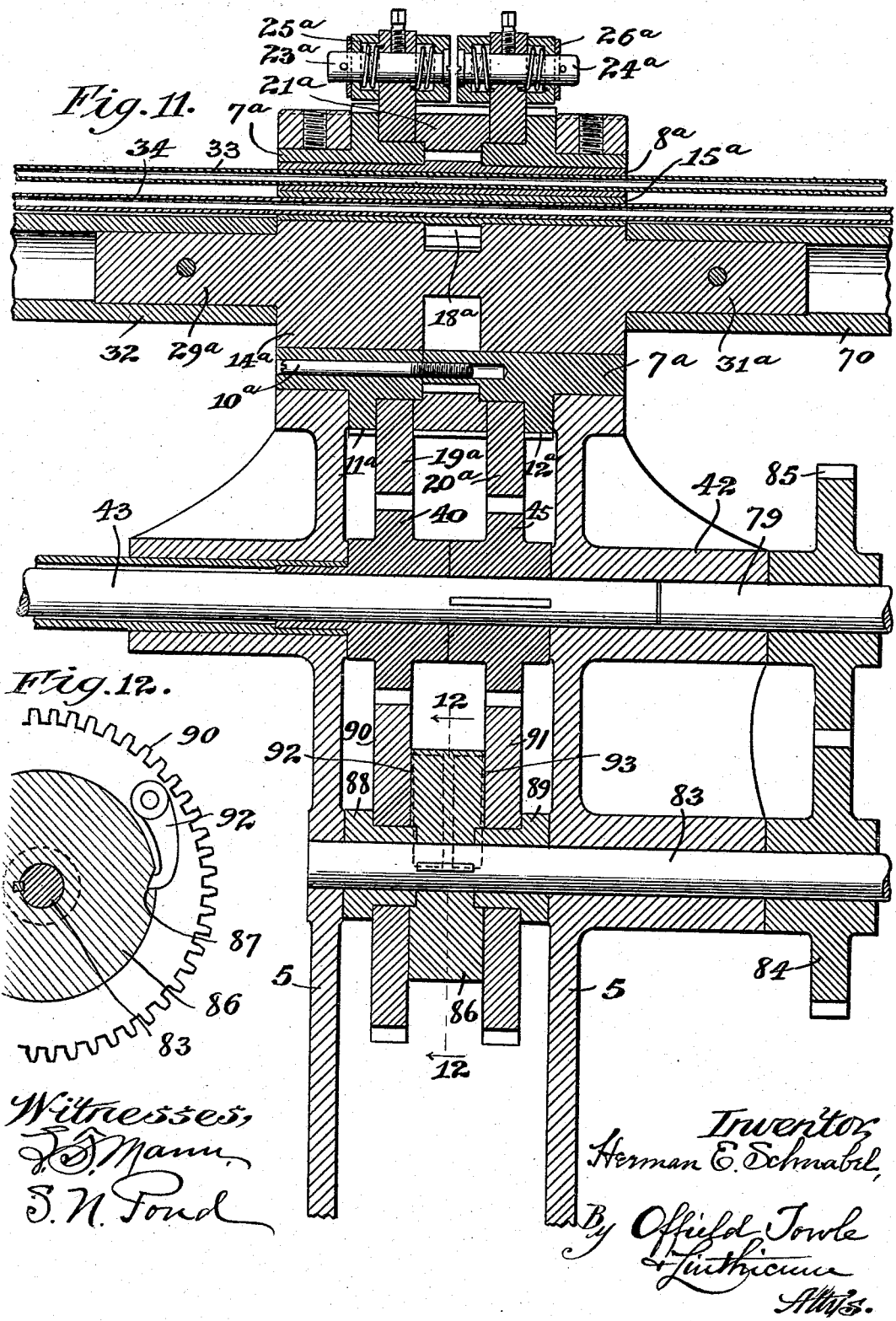

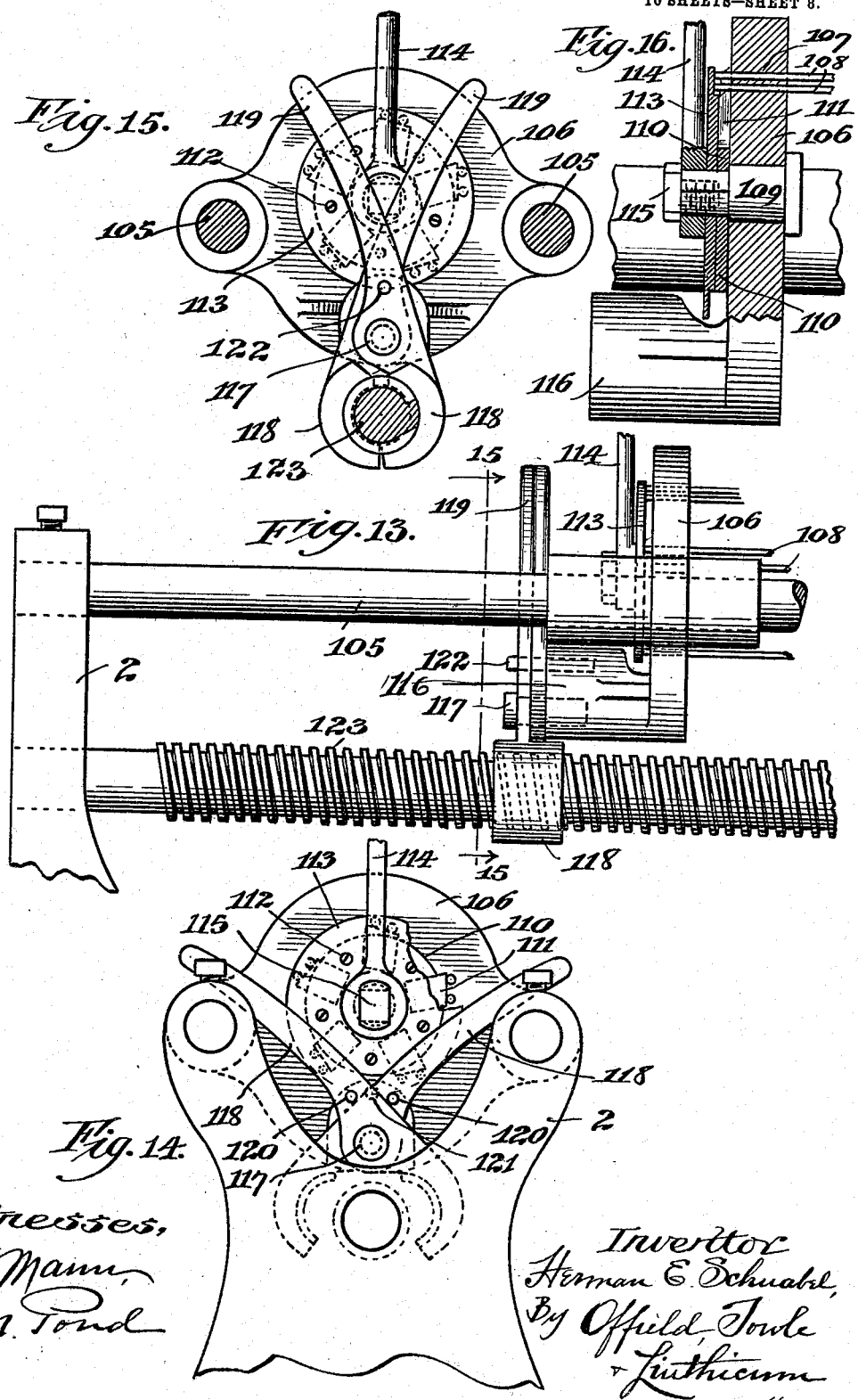

H. E. SCHNABEL.
MACHINE FOR MAKING WIRE POSTS, &c.
APPLICATION FILED NOV. 8, 1907.
937,474.
Patented Oct. 19, 1909.
10 SHEETS—SHEET 9.
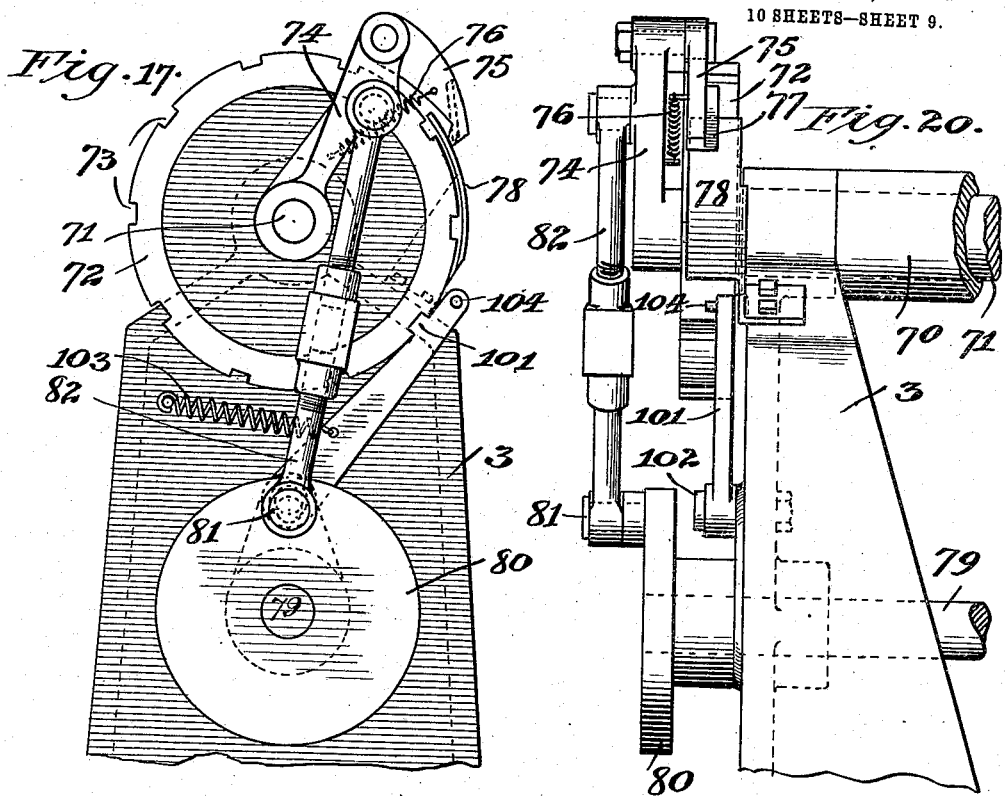
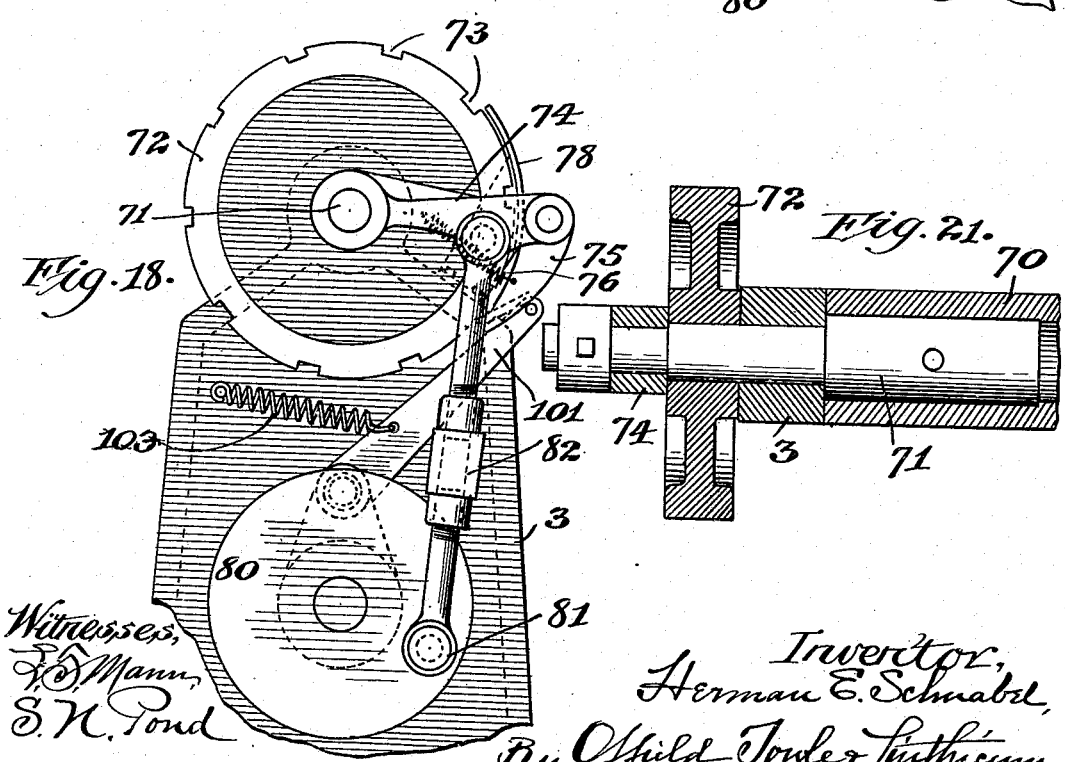
Witnesses:
Inventor,
Herman E. Schnabel,
By Offield, Towle & Linthicum
Atty's.

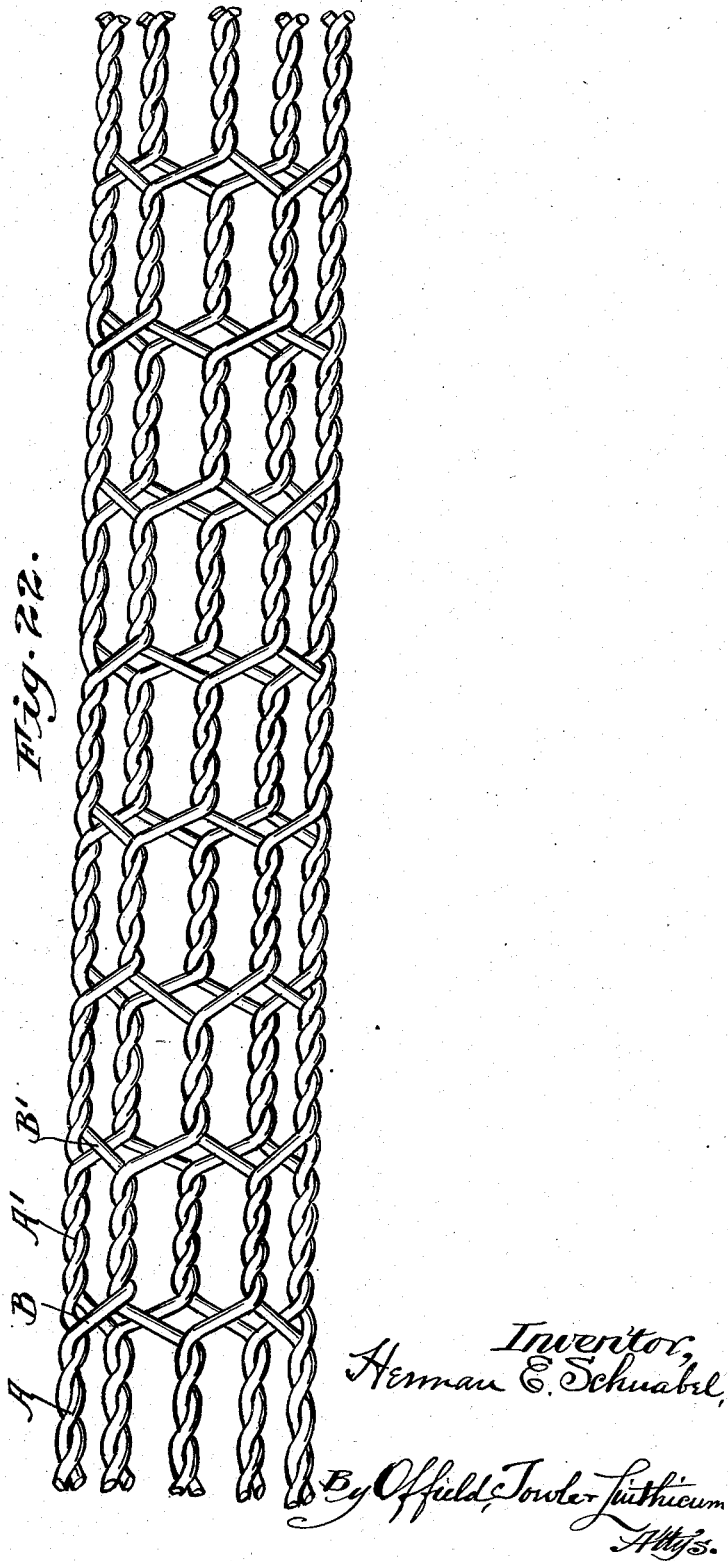

UNITED STATES PATENT OFFICE.

HERMAN E. SCHNABEL, OF CHICAGO, ILLINOIS, ASSIGNOR TO CHARLES S. ROBERTS, OF CHICAGO, ILLINOIS.

MACHINE FOR MAKING WIRE POSTS, &c.

937,474.   Specification of Letters Patent.   Patented Oct. 19, 1909.

Application filed November 8, 1907.   Serial No. 401,246.

*To all whom it may concern:*

Be it known that I, HERMAN E. SCHNABEL, a citizen of the United States, residing at Chicago, in the county of Cook and State of Illinois, have invented certain new and useful Improvements in Machines for Making Wire Posts, Poles, and the Like, of which the following is a specification.

This invention relates to machines for making tubular posts out of wire; the general object and design of the invention being to produce a light, strong hollow post or pole formed from a series of lengths of heavy wire or small rod metal interwoven and intertwisted in a manner to produce a reticulated or openwork tubular structure in which the several strands shall be so disposed as to mutually strengthen and stiffen each other longitudinally of the finished article, and shall produce in the latter an attractive and ornamental appearance.

In accordance with the foregoing object, the machine of my invention comprises essentially the following instrumentalities. In a main twisting head are journaled a pair of bearing members for the individual twisters, one of these bearing members being of annular form and containing within it the other bearing member of generally circular outline. In the opposed faces of these bearing members are journaled the matching or mating segments of the individual twisters, the two segments of each twister each having formed therethrough a hole parallel with the axis of the twister through which holes the pair of wires are passed; and on each twister is an annular pinion likewise formed in matching or mating segments. An annular series of these twisters is employed, the outer segments of the several twisters being carried by the outer bearing member, and the inner segments being carried by the inner bearing member. Surrounding this group of twisters, each of which has its driving pinion formed in a pair of matching segments, as above explained, is an internally toothed gear that meshes with said series of pinions, and is intermittently driven always in the same direction through the agency of a pair of alternately acting pawls engaging a ratchet on the outer circumference of said internal gear. By this means the several individual twisters are rotated on their own axes to thereby twist together the two strands of wire carried by the segments thereof. At the conclusion of each twisting movement, the segments of adjacent gears are bodily transposed so as to shift the two wires carried by the segments of each twister in opposite directions around the series into coöperation with the wires carried by mating segments of adjacent twisters on either side. This is done by a mechanism which simultaneously shifts, by a partial rotary movement, the two inner and outer bearing members for the segmental twisters in opposite directions, this movement taking place immediately at the conclusion of each twisting movement and immediately prior to the beginning of the next twisting movement; in other words, between two consecutive twisting movements. Means are provided in association with this shifting mechanism to automatically lock the shifting devices at the conclusion of each shifting movement and during the period of the immediate succeeding twisting movement, so as to insure the perfect mating during the twisting movement of the mating segmental parts of each twister.

In association with the foregoing, there is also employed an automatic device for effecting continuous travel of the wires or rods through the machine as the article is being formed therefrom; this preferably taking the form of a clamp engaging the forward ends of the wires or rods as they project from the twisting head, said clamp being mounted on a suitable track and given a continuous longitudinal movement away from the twisting head preferably by means of a rotating feed screw engaging a nut carried by the clamp.

To insure a substantially tubular form of the finished article, a forming head or mandrel is applied centrally to the forward face of the twisting head, over which the twisted and interwoven wires are drawn.

In drawings accompanying this specification and forming a part thereof I have illustrated a machine embodying the operative principle of my invention, and also a section of the product of the machine.

Referring to the said drawings,—Figure 1 is a side elevational view of that portion of the machine in which the twisting and weaving of the wires are accomplished and at which the product of the machine is delivered. Fig. 2 is a side elevation, partly in vertical section, of the wire-receiving end of the machine, also showing at the left a portion of the twister head and its operating mechanism disclosed in Fig. 1. Fig. 3 is a longitudinal section through the main longitudinal driving shaft of the machine. Fig. 4 is a top plan view of that portion of the machine shown in Fig. 2, but showing the complete driving mechanism of the twister head as it would appear in a plan view of Fig. 1. Fig. 5 is an enlarged cross-sectional view on the line 5—5 of Fig. 1, viewed in the direction indicated by the arrows. Fig. 6 is an enlarged vertical longitudinal section through the twister head substantially on the offset line 6—6 of Fig. 7, viewed in the direction indicated by the arrows. Fig. 7 is a vertical transverse section on the offset line 7—7 of Fig. 6, viewed in the direction of the arrows. Fig. 8 is a top plan view of the guide head that supports and actuates the tubular wire guides in rear of the twister head and conformably to the movements of the latter; the construction of this guide head being substantially identical with that of the twister head itself. Fig. 9 is a vertical transverse section on the line 9—9 of Fig. 8. Fig. 10 is a detail fragmentary view in side elevation illustrating in part the controlling means of the pawl that actuates the ratchet of the outer segment-shifter. Fig. 11 is an enlarged detail vertical section longitudinally through the guide head and underlying gearing which drives the latter and the actuating mechanism of the inner segment-shifter. Fig. 12 is a detail cross-section on the line 12—12 of Fig. 11, looking in the direction of the arrows. Figs. 13, 14, 15 and 16 are detail views of the mechanism that draws the wires through the machine; Fig. 13 being a side elevational view, Fig. 14 an end elevation of Fig. 13, with the split nut disengaged from the feed-screw, Fig. 15 a cross-section on the line 15—15 of Fig. 13, viewed in the direction of the arrows; and Fig. 16 a side elevation, partly broken away and in vertical section, of Fig. 15. Figs. 17, 18, 19, 20 and 21 are details of the pawl which actuates the ratchet of the inner segment-shifter and its immediate actuating and controlling mechanism, showing also the dog which locks said inner shifter against movement at all times except during its prescribed movement; Fig. 17 being an end elevational view, showing the pawl in fully retracted position; Fig. 18 being a similar view showing the pawl in an intermediate position of its forward movement; Fig. 19 being a similar view showing the pawl in operative engagement with the ratchet; Fig. 20 being a side elevation of Fig. 17, and Fig. 21 being a longitudinal section through the ratchet and its bearing. Fig. 22 is an enlarged elevational view showing a section of the product of the machine.

In its general features of organization and arrangement, the machine of my invention comprises a bed, a pair of end uprights or standards, and a pair of intermediate upright frame members, the one carrying a twister head and the other a guide head, a central tubular shaft extending from the twister head through the guide head and to a support on the rear standard and constituting as a whole what I term the inner segment-shifter, an underlying sectional power-transmitting shaft likewise extending beneath the twister and guide heads and through the rear standard, a series of guide tubes for the wires which at one end are tapped into what I term the outer segment-shifter of the twister head and pass through the corresponding outer segment-shifter of the guide head, and a delivery mechanism mounted on a slideway and actuated by a feed-screw disposed longitudinally of the machine between the front standard and the twister head, together with actuating mechanisms for the several parts and locking mechanisms for the twister segment-shifters, all as hereinafter more particularly set forth.

Referring first to the principal assembled views, Figs. 1, 2, 4 and 5, 1 designates each of a pair of parallel I-beams constituting the bed of the machine and extending the full length thereof, on and transversely of the ends of which are mounted end standards or uprights 2 and 3, respectively. Between said end standards are mounted on and across the bed beams 1 a pair of intermediate upright frame members, each consisting of a pair of symmetrical standards spaced apart to accommodate mechanism lying therebetween, the twin uprights of one of said frame members being designated 4, and the corresponding twin uprights of the other frame member being designated 5. In bearings 6 on the upper ends of the twin uprights 4 are rotatably mounted a pair of substantially duplicate annular members 7 (Fig. 6) in which are journaled a series (five, as herein shown) of major segments 8 of the individual twisters, said twister segments extending through and between both of said bearing members 7, as shown in Fig. 6, and each having formed therethrough longitudinally thereof a wire-receiving hole 9. The outer bearing members 7 are united longitudinally of the twister head by a series of screws 10 so as to turn in unison; and said bearing members 7 have formed on their outer peripheries ratchets 11 and 12, the ratchet 11, as shown in Fig. 5, having in addition to the ratchet teeth alternately disposed locking notches 13 for a purpose hereinafter described.

Journaled within the annular bearing member 7 is an inner bearing member 14 that contains seats or bearings for a series of minor segments 15 of the individual twisters, which latter mate with the major segments 8 when registering with the latter, in the manner clearly shown in Fig. 7. Said minor segments likewise have formed therethrough and longitudinally thereof wire-receiving holes 16. The major and minor segments of the twisters are provided centrally thereof between the annular bearing members 7 with mating segment pinions 17 and 18, respectively, preferably formed integral therewith, by which said segmental twisters are individually rotated through mechanism hereinafter described.

Rotatably mounted on the members 7 inwardly of the ratchets 11 and 12 are a pair of pawl-carrying segment gears 19 and 20, and likewise rotatably mounted on the inner ends of the members 7 between the segment gears 19 and 20 is an internally toothed gear 21 that meshes with all of the several segment pinions 17, 18, driving the latter. On its outer periphery the gear 21 is formed as a circular ratchet 22, as clearly shown in Fig. 7. Keyed in and extending transversely through the segment gears 19 and 20 are pawl shafts 23 and 24 on the outer projecting ends of which are pivoted pawls 25 and 26, coöperating with the ratchets 11 and 12, respectively, and on the inner projecting ends of which are pivoted pawls 27 and 28, coöperating with the central ratchet 22. The two pawls 27 and 28 alternately engage and drive the internal gear 21 continuously in one direction, imparting therethrough rotation to the individual twisters and effecting the twisting of the wires; while the pawls 25 and 26 effect the shifting of the outer or major twister segments at the conclusion of each twisting operation, all as hereinafter more particularly described. On the delivery end of the twister head and preferably integral with the central bearing member 14 thereof is a projecting boss 29 on which is secured a forming head or mandrel 30 (Figs. 2 and 4); and on the opposite end of the member 14 is a similar boss 31 to which is secured a tubular shaft 32 connecting said member 14 with a corresponding member of the guide head. This latter in structure and organization is identical, with the exception of the mandrel 30, with the twister head just described, as will be seen by reference to Figs. 8 and 9 showing the details thereof; and hence a detail description of said guide head is unnecessary; but for convenience in readily identifying the several parts thereof, I have applied to the latter the same reference characters used to designate corresponding parts of the twister head, with the letter a as an alphabetical exponent.

Tapped into the ends of the twister segments lying nearest the guide head and in axial alinement with the holes 9 and 16 of said segments are two series of wire-conducting tubes 33 and 34 which pass through and project some distance beyond the corresponding twister segments of the guide head, as clearly shown in Figs. 2 and 4, the outer series of tubes 33 registering with and connecting the major segments of the twisters, and the inner series 34 registering with and connecting the minor segments of the twisters. These tubes guide and support the individual wires during their passage through the machine; and the duplication of the twister head in the guide head is, of course, for the purpose of supporting and giving to these wire guiding and supporting tubes at one end thereof identically the movements given to them by the twister head at the other end.

Passing now to a description of the actuating and controlling mechanism of the twister and guide heads, and referring more especially to Figs. 2 and 3, 35 designates a tubular shaft journaled in bearing bosses 36 and 37 of the adjacent frame members 4 and 5, and having fast thereon a spur pinion 38. Fast on the ends of said shaft 35 are other spur pinions 39 and 40, the former of which meshes with the segment gear 20 of the twister head, while the latter meshes with the segment gear $19^a$ of the guide head. Lying within the hollow shaft 35, and journaled in bearing bosses 41 and 42 of the outer frame members 4 and 5 is a shaft 43, keyed on which are spur pinions 44 and 45 that mesh with the segment gears 19 and $20^a$, respectively. On the shaft 43 in advance of the twister head is keyed a shaft-driving pinion 46.

A simultaneous rotary movement in opposite directions is imparted to the shafts 35 and 43 through mechanism which also simultaneously reverses the direction of rotation of each shaft periodically, and which will next be described.

Referring more particularly to Figs. 1, 4 and 5, 47 designates a pair of bed beams secured to and extending laterally of the main bed beams 1, upon which are mounted a pair of upright frame members 48, in brackets on the lower ends of which is journaled a horizontal drive-shaft 49 carrying a driving pulley 50. On the ends of shaft 49 are spur pinions 51 and 52 that mesh with and drive a pair of large spur gears 53 and 54, respectively, fast on a shaft 55 journaled in bearings 56 on the upper ends of the uprights 48. On the outer faces of the spur gears 53 and 54 are wrist-pins 57 and 58, respectively, located at diametrically opposite points, on which are pivoted rack-bars 59 and 60 that are slidingly suspended in saddles 61 and 62, respectively, suspended from shafts 43 and 35, and that engage and drive the spur pinions 46 and 38, respectively. It will thus be seen that the large driving gear 53, through its rack-bar 59 and coöperating pinion 46 rotates the inner shaft 43 continuously in one direction during one-half revolution of the gear 53 and then rotates said shaft continuously in the opposite direction through the other half of the rotation of said gear; the companion gear 54, through its rack-bar 60 and coöperating pinion 38, rotating the tubular shaft 35 in a similar manner, but always in an opposite direction to the rotation of the shaft 43, owing to the fact that the wrist-pins of the driving gears are set at diametrically opposite points. In this way, through the intermediate pinions 44 and 39 the segment gears 19 and 20 are continuously oscillated always in opposite directions, and the pawls 27 and 28 through the ratchet 22 take turns in driving the internal gear 21 through which the individual twisters are rotated, one of said pawls driving the gear while the other pawl is returning for a fresh hold on the ratchet, and vice versa.

At the conclusion of the twisting operation, which occurs shortly prior to the completion of each driving movement of the pawls 27 and 28 on the ratchet of the internal gear 21, the inner and outer segments of the twisters are shifted, the outer or major segments being shifted one step to the right, and the inner or minor segments being shifted one step to the left, as shown in Fig. 7, thus carrying the two wires carried by the segments of each twister in opposite directions spirally of the article being formed. The connected annular members 7 constituting the bearing and shifting member for the outer or major segments is given a partial turn to the right, as viewed in Fig. 7, alternately through the agency of the pawls 25 and 26 and their coöperating ratchets 11 and 12. Referring to Figs. 8 and 10, wherein I have shown the manner and means of controlling the pawl 26$^a$ (which is identical with that of the pawls 25, 26, and 25$^a$, performing the same function) 63 designates a spring-pressed pin mounted in and transversely of the segment gear 20$^a$, which pin has a rounded outer end adapted to coöperate with a pair of shallow depressions or sockets 64 and 65 (Fig. 10) formed in the adjacent side of the pawl 26$^a$; and 66 designates a torsion spring seated in a socket 67 in the face of the pawl and so connected to the latter and to the face of the segment gear as to normally urge the pawl toward the ratchet 12$^a$. When the pin 63 engages the socket 64 of the pawl, the latter is held out of engagement with the teeth of the ratchet, and when said pin engages the socket 65 of the latter, the pawl is held in engagement with a tooth of the ratchet. On the opposite side of the pawl is a laterally projecting pin 68 that engages a cam 69 formed in the adjacent side wall of the bearing member 6$^a$. The pin 63 normally engages the socket 64, holding the pawl out of engagement with the ratchet; but when, near the end of the forward travel of the pawl, its pin 68 engages the inner side of cam 69, the nose of the pawl is forced thereby into the next underlying notch of the ratchet disk and during the remainder of its travel actuates the outer segment-shifter of the twister, the pin 63 snapping across into the socket 65 and holding the pawl to its work. On the return movement of the pawl, as the nose of the latter rides out of its socket, the pin 63 snaps back into socket 64, and pin 68 rides up on the outer side of cam 69, the upper end of which latter rocks the pawl still farther away from the ratchet; spring 66, however, returning it to a position to again engage the inner side of cam 69 through its pin 68 near the end of its next forward movement. In this manner the segment-shifters of the twister and guide heads are actuated by the pawls 25, 25$^a$ and 26, 26$^a$, the latter operating alternately or by turns. The pawls 27 and 28 of the twister head and the corresponding pawls 27$^a$ and 28$^a$ of the guide head are spring-actuated toward their respective ratchets, as indicated in Fig. 6, riding idly over the ratchet teeth on the return movement.

The inner segment-shifters of the twister and guide heads, which are rigidly connected through the tubular shaft 32, are actuated by the following mechanism. Pinned to the outer projecting boss 31$^a$ (Fig. 11) of the guide head segment-shifter 14$^a$ is a tubular shaft 70 that forms, in effect, a longitudinal extension or continuation of the tubular shaft 32. The opposite end of the shaft 70 is entered by a short stub shaft 71 (Fig. 21) pinned thereto, said shaft 71 having a bearing in the upper end of the standard 3 (see Figs. 17 to 21, inclusive) and having fast on its overhanging end a disk 72 in the periphery of which are formed a spaced series of combined ratchet and locking notches 73. The stub shaft 71 projects beyond the face of the disk 72 and has loosely hung thereon an arm 74, to the outer end of which is pivoted a pawl 75 overlying the periphery of the disk 72 and normally urged toward the latter by a spring 76. The pawl 75 has on the inner side thereof a laterally projecting cam flange 77; the purpose of which is hereinafter explained; and secured to the upright 3 and overlying a portion of the periphery of the disk 72, traveled by the nose of the pawl, is a shield or guard 78, the purpose of which is to prevent the pawl from engaging a notch of the disk prior to the time prescribed for such engagement. The arm 74 is rocked to carry the pawl 76 on its to and fro movements, by the following mechanism.

Referring particularly to Figs. 2, 3 and 11, 79 designates a shaft section disposed in line with the shaft 43 beneath and parallel with the extension shaft 70, and journaled at one end in the bearing boss 42 and at its opposite end in the upright 3. On the projecting end of shaft 79 is keyed a disk 80 (Figs. 17 to 20), on the wrist-pin 81 of which is pivoted the lower end of an adjustable pitman 82, the upper end of this latter being pivoted to the arm 74. The radial distance of the wrist-pin 81 from the center of the disk 80 is less than the radial distance from the pivot center of arm 74 to the pivotal connection of the pitman 82 with said arm, so that the rotary movement of the disk 80 imparts an oscillating movement to the arm 74. The shaft 79 is rotated practically continuously always in the same direction from the driving pinions 40 and 45 acting by turns through the following driving connections shown in enlarged sectional detail in Fig. 11. Journaled in and between standards 5 below and parallel with the shafts 43 and 79 is a short countershaft 83 having fast thereon a spur gear 84 meshing with and driving a spur gear 85 keyed on shaft 79. On shaft 83 between the frame members 5 is keyed a disk 86 (Figs. 11 and 12) having formed across the periphery thereof a single ratchet notch 87. Loosely mounted on bearing sleeves 88 and 89 surrounding the shaft 83 on either side of the ratchet disk 86 are a pair of gears 90 and 91, pivoted on the inner faces of which are twin pawls 92 and 93. The gears 90 and 91 mesh with and are driven by the pinions 40 and 45, respectively. As the pinions 40 and 45 rotate alternately in opposite directions and always travel in opposite directions to each other, they, of course, impart a similar rotation to the gears 90 and 91, which latter gears are of such size as to each receive very slightly more than a single complete rotation before reversing. As a result, the pawls 92 and 93 alternately engage the ratchet notch 87 and rotate the disk 86 and shaft 83, one pawl taking up the work as soon as the other has dropped it, so that the movement transmitted to shaft 79 is a rotary movement always in a single direction and is approximately continuous, with but an instantaneous pause between the operative movements of the pawls 92 and 93. Through the mechanism last described the pawl 75 is caused to travel back and forth, the nose of the pawl entering a notch 73 of the disk 72 as soon as, in its forward movement, it has passed over the lower end of the guard 78, and on its continued forward movement turning the shafts 70 and 32 and the inner twister-segment-shifters connected thereto through one step corresponding in angular extent exactly to the movement of the outer twister-segment shifter previously described, but in the opposite direction.

It is, of course, desirable to provide means for locking the segment-shifters at all times except during the shifting movements thereof; and the means which I have provided for thus locking the outer segment-shifter consists of the following. 94 designates a shaft journaled in and between the frame uprights 4 and 5, keyed on the ends of which are dogs 95 and 95$^a$ that are adapted to engage the locking notches 13 of the ratchet disk 11 and similar notches of the ratchet disk 11$^a$, respectively. The dog 95 has an integral arm 96, clearly shown in dotted lines in Fig. 5, which arm carries a roller 97 that engages a cam 98 keyed on the shaft 55 of the large gears 53 and 54. The roller 97 is maintained in rolling engagement with the edge of the cam by a spring 99, and the cam has formed on its periphery at diametrically opposite points a pair of cam notches or depressions 100 into which the roller falls once during each half revolution of the driving gears 53 and 54 at the proper times to release the dogs 95 and 95$^a$ from their respective ratchets and thus permit the actuation of the segment-shifters; the roller 97 riding out of each notch instantly at the conclusion of each shifting movement to thereby restore the locking effect of the dogs.

The corresponding locking mechanism of the inner segment-shifter is illustrated in Figs. 17 to 20, and consists primarily of a dog 101 that is pivoted at 102 on the frame-member 3 behind the disk 80 and is normally urged into locking engagement with the ratchet disk 72 by a spring 103. This dog carries on its outer end a laterally projecting pin 104 that lies in the path of travel of the cam flange 77 of the pawl 75; so that, as the pawl 75 advances and rides off the lower end of the shield 78, cam flange 77 engages the pin 104 and retracts the dog, permitting the nose of the pawl to drop into the notch 73, previously engaged by the dog, and advance the disk. As the pawl reaches the limit of its advance movement, carrying the disk with it, the pin 104 rides off the rear end of the cam, and the dog instantly snaps into the next locking notch, as shown in Fig. 19; and on the return movement of the pawl, the under side of the cam 77 engages the pin 104 on the outer side of the latter and rides idly over said pin onto the shield 78.

The mechanism which draws the wires through the machine during the twisting and weaving operation is preferably located between the discharging end of the twister head and the end post 2 of the machine frame, and consists principally of the following parts. 105 designates a slideway herein shown as comprising a pair of horizontal, parallel, round rods or bars supported at their ends in the frame uprights 2 and 4. Fitted to this slideway is a carriage (see Fig. 1 and Figs. 13 to 16, inclusive), consisting chiefly of a vertical transversely extending plate 106 through which is formed an annular series of holes 107 corresponding in relative spacing to the holes formed through the several twisters of the twister head and adapted to receive the ends of the wires 108 projecting from the latter. On the projecting squared end of a stub shaft 109 journaled in the carriage centrally thereof is a radially slotted clamp-disk 110, to the slots of which are fitted clamping knives 111 having beveled outer cam edges adapted to engage the wires and, under a turning movement of the clamping disk, cut into the wires sufficiently to securely grip them to the carriage. Outside of the clamping disk 110 and secured thereto as by screws 112 is a stop-disk 113 against which the forward ends of the wires abut. Outside of the stop-disk 113 is a handle 114 for operating the clamp, the latter being secured on the shaft by a headed screw 115. On the lower side of the plate 106 is a laterally projecting boss 116, in which is secured a shaft 117 on which are pivoted the two halves 118 of a divided nut, said members 118 having handles 119 projecting above their pivot by which they are operated. In the handles 119 are formed holes 120 which, when the handles are drawn together to clamp the nut in operative position, are in registration with each other and with a hole 121 in the boss 116, in which holes is inserted a pin 122 locking the nut in operative position. The divided nut engages a feed-screw 123 journaled in the frame members 2 and 4 beneath and parallel with the slideway bars 105. Screw 123 receives motion from the main driving shaft 49 through a sprocket 124 on the latter (Fig. 4), a sprocket chain 125 leading therefrom to a sprocket 126 (Fig. 2) on a short shaft 127 journaled in bearings 128 between the lower ends of the uprights 4, a sprocket 129 (Fig. 5) on the outer end of shaft 127, and a sprocket chain 130 connecting the latter with a sprocket 131 on the feed-screw 123.

In order to insure the rotation of the driving shaft 49 always in a single direction and to prevent accidental back turning of said shaft, I provide on the latter, alongside the sprocket 124 a ratchet 132 (Fig. 1) and a detent pawl 133 coöperating therewith.

The operation of the several coöperating mechanisms of the machine has been to a considerable extent already indicated in connection with the description thereof, but the connected operation of the machine as a whole may be briefly described as follows: The wires from which the post, pole, or other article is to be formed are inserted into and through the tubular guides 33 and 34 at the right-hand end of the machine, as shown in the general views, Figs. 2 and 4, and passing through the twister head and over the mandrel 30 and through the holes of the carriage 106 are securely gripped in the latter by the clamp carried thereby, said carriage having been moved to a position directly in front of the mandrel. The divided nut is then thrown and locked into operative engagement with the feed-screw, and the power is applied to the driving pulley 50. The individual twisters are thereupon set in rotation, forming the first annular series of twists indicated by A at the left in Fig. 22. Near the conclusion of the rotary movement of the twister-actuating gear 21, the locking dogs which hold the outer and inner segment carriers and shifters are retracted, and during the remaining movement of the twister-driving gear 21, the two twister-segments of each individual twister are bodily shifted one step in opposite directions into coöperation with adjacent twister-segments; at the conclusion of which shifting movement the locking dogs are returned to operative position relatively to the shifters. This opposite shifting of the two segments of each twister moves the respective wires carried thereby in opposite directions around the axis of the twister head, which movement, combined with the longitudinal advance of the wires, forms in the product the obliquely disposed strands marked B (Fig. 22). After an instantaneous pause the twister-driving gear again starts in operation, producing the second series of twists A′ in the product, which twisting movements are succeeded, as before, by another shifting of the outer and inner segment-carriers, producing the next series of diagonal strands B′; and so on until the wires have been drawn entirely through the machine.

It will be observed that the rotary movements that carry and effect the shifting of the outer and inner segments of the twisters, respectively, always move in a single direction of rotation and in opposite directions relatively to each other.

The product of the machine is a tubular skeleton wire post or pole having the general appearance indicated in Figs. 1 and 22, in which one-half of the series of wires are carried spirally around the finished product in one direction and the other half are similarly carried around the finished product in the other direction, oppositely moving wires at each intersection of each other's path being intertwisted for several turns, the extent of which can be regulated by the relative sizes of the driving gear and the driven pinions of the individual twisters. The post or pole thus formed is comparatively light, and of a stiffness or rigidity depending largely upon the gage of wire used and the softness or hardness of such wire; but capable of being made abundantly stiff and strong to serve the purposes of fence posts and supporting poles for a variety of uses. It may be used as an open-work metal post or pole, complete in itself;

or as a skeleton reinforcement for a cement or concrete post or pole.

I am aware that the use of divided or segmental twisters for the purpose of intertwisting two wires carried by said segments, with means for subsequently shifting said segments in a straight line into coöperation with their corresponding segments in the art of weaving is old, and I make no claim broadly to such a mechanism; but so far as I am aware my present invention presents the first instance of segmental twisters arranged in a circular or annular form and adapted to effectuate the generally round tubular product shown and described.

I claim:

1. In a machine of the character described, the combination with an annular series of rotary twisters each formed of a pair of mating wire-carrying sections, of means for turning said twisters on their own axes, and means for shifting one section of each twister, between twisting operations, into mating relation to the coöperating section of another twister.

2. In a machine of the character described, the combination with an annular series of rotary twisters each formed of a pair of mating wire-carrying sections, of means for turning said twisters on their own axes, and means for shifting one section of each twister, between twisting operations, always in the same direction of movement, into mating relation to the coöperating section of a contiguous twister.

3. In a machine of the character described, the combination with an annular series of rotary twisters each formed of a pair of inner and outer wire-carrying segments, of means for turning said twisters on their own axes, and means for shifting said inner and outer segments, between twisting operations, simultaneously in opposite directions into mating relation to coöperating sections of contiguous twisters.

4. In a machine of the character described, the combination with an annular series of rotary twisters each formed of a pair of inner and outer wire-carrying segments, of means for turning said twisters on their own axes, and means for shifting said inner and outer segments between twisting operations, simultaneously in opposite directions and each always in the same direction of movement, into mating relation to coöperating sections of contiguous twisters.

5. In a machine of the character described, the combination with an annular series of rotary twisters each formed of a pair of inner and outer wire-carrying segments, of inner and outer bearing members in which said segments are respectively journaled, means for turning said twisters on their own axes, and means for effecting a relative turning movement of said inner and outer bearing members, between twisting operations, sufficient to carry the segments of one series each into mating relation to a contiguous segment of the other series.

6. In a machine of the character described, the combination with an annular series of rotary twisters each formed of a pair of inner and outer wire-carrying segments, of inner and outer bearing members in which said segments are respectively journaled, means for turning said twisters on their own axes, and means for effecting turning movements of said inner and outer bearing members, between twisting operations, in opposite directions sufficient to carry the segments of each series each into mating relation to a contiguous segment of the other series.

7. In a machine of the character described, the combination with an annular series of rotary twisters each formed of a pair of inner and outer wire-carrying segments, of inner and outer bearing members in which said segments are respectively journaled, means for turning said twisters on their own axes, and means for effecting turning movements of said inner and outer bearing members, between twisting operations, in opposite directions and each always in the same direction of movement, sufficient to carry the segments of each series each into mating relation to a contiguous segment of the other series.

8. In a machine of the character described, the combination with an annular series of rotary twisters each formed of a pair of inner and outer wire-carrying segments, of inner and outer bearing members in which said segments are respectively journaled, means for turning said twisters on their own axes, means for effecting turning movements of said inner and outer bearing members, between twisting operations, in opposite directions sufficient to carry the segments of one series each into mating relation to a contiguous segment of the other series, and means for locking said bearing members against movement during the twisting operations.

9. In a machine of the character described, the combination with an annular series of rotary twisters each formed of a pair of inner and outer wire-carrying segments, of inner and outer bearing members in which said segments are respectively journaled, mating segment pinions formed on said inner and outer twister segments, respectively, an internally toothed gear surrounding and engaging said pinions, means for driving said gear, and means for effecting simultaneous turning movements of said bearing members in opposite directions between successive rotary movements of the individual twisters whereby to shift said twister segments.

10. In a machine of the character described, the combination with an annular series of rotary twisters each formed of a pair of inner and outer wire-carrying segments, of inner and outer bearing members in which said segments are respectively journaled, mating segment pinions formed on said inner and outer twister segments, respectively, an internally toothed gear surrounding and engaging said pinions, a pair of rack and pinion driving mechanisms, alternately acting driving connections between the latter and said internally toothed gear, and means for shifting the inner and outer twister segments in opposite directions between twisting operations.

11. In a machine of the character described, the combination with an annular series of rotary twisters each formed of a pair of inner and outer wire-carrying segments, of inner and outer bearing members in which said segments are respectively journaled, mating segment pinions formed on said inner and outer twister segments, respectively, an internally toothed gear surrounding and engaging said pinions, a ratchet fast with said gear, a pair of oppositely traveling pawls alternately engaging said ratchet and driving said gear, and means for effecting simultaneous turning movements of said bearing members in opposite directions during the latter portion of the gear-driving travel of each of said pawls.

12. In a machine of the character described, the combination with an annular series of rotary twisters each formed of a pair of inner and outer wire-carrying segments, of inner and outer bearing members in which said segments are respectively journaled, mating segment pinions formed on said inner and outer twister segments, respectively, an internally toothed gear surrounding and engaging said pinions, a ratchet fast with said gear, a pair of oppositely traveling pawls alternately engaging said ratchet and driving said gear, and pawl-and-ratchet mechanism for effecting simultaneous turning movements of said bearing members in opposite directions during the latter portion of the gear-driving travel of each of said pawls.

13. In a machine of the character described, the combination with an annular series of rotary twisters each formed of a pair of mating wire-carrying sections, of means for turning said twisters on their own axes, means for shifting one section of each twister, between twisting operations, into mating relation to the coöperating section of another twister, guides for the several wires leading to said twisters, and means for supporting said guides and imparting thereto rotary and shifting movements corresponding to the movements of said twister sections.

14. In a machine of the character described, the combination with a twister head having an annular series of segmental twisters each adapted to carry a pair of wires, and means for rotating the individual twisters and shifting the segments thereof between twisting operations, of a series of guides for the individual wires leading into said twister head, and means for supporting said guides and imparting thereto rotary and shifting movements corresponding to the movements of said segmental twisters.

15. In a machine of the character described, the combination with a twister head having an annular series of segmental twisters each adapted to carry a pair of wires, and means for rotating the individual twisters and shifting the segments thereof between twisting operations, of a guide head duplicating the elements of said twister head, wire guides extending between the segmental twisters of said twister head and the corresponding elements of said guide head, and means for rotating the individual twisters and the corresponding elements of the guide head and shifting the segments thereof between twisting operations.

16. In a machine of the character described, the combination with a twister head having an annular series of segmental twisters apertured for the passage of wires therethrough, and means for rotating the individual twisters and shifting the segments thereof between twisting operations, of a guide head duplicating the elements of said twister head, tubular wire guides extending between the segmental twisters of said twister head and the corresponding elements of said guide head and communicating with the apertures thereof, and means for rotating the individual twisters and the corresponding elements of the guide head and shifting the segments thereof between twisting operations.

17. In a machine of the character described, the combination with a twister head having an annular series of rotary twisters each formed of a pair of inner and outer wire-carrying segments, of means for rotating said twisters and for shifting the segments thereof between twisting operations, and means for drawing the wires through said twister head.

18. In a machine of the character described, the combination with a twister head having an annular series of rotary twisters each formed of a pair of inner and outer wire-carrying segments, of means for rotating said twisters and for shifting the segments thereof between twisting operations, a slideway beyond said twister head, a wire clamp mounted to travel on said slideway, and means for effecting an outward travel of said wire clamp during the wire-forming operation.

19. In a machine of the character described, the combination with a twister head having an annular series of rotary twisters each formed of a pair of inner and outer wire-carrying segments, of means for rotating said twisters and for shifting the segments thereof between twisting operations, a slideway beyond said twister head, a wire clamp mounted to travel on said slideway, a rotatable feed-screw alongside of said slideway, and a nut engaging said feed-screw and connected to said clamp.

20. In a machine of the character described, the combination with a wire-forming head embodying mechanism for producing a tubular wire skeleton structure, of a traveling clamp for drawing the wire through said head, and a mandrel between said clamp and head over which said tubular structure is drawn.

21. In a machine of the character described, the combination with a twister head having an annular series of rotary twisters each formed of a pair of inner and outer wire-carrying segments, of means for rotating said twisters and for shifting the segments thereof between twisting operations, a traveling clamp for drawing the wires through said twister head, and a mandrel between said clamp and twister head, over which the wires are drawn.

22. In a machine for weaving tubular fence posts of wire, in combination, means for holding the independent wires which are to be interwoven in pairs, said holding means being disposed in circular series, means for simultaneously imparting to said holding means a rotary movement, each pair about a common axis, means for shifting the members of each pair with the wires in opposite directions and into pair arrangement with adjacent holders, and means for simultaneously advancing the wires whereby to present portions thereof to be twisted in spirals around the axis of the post.

HERMAN E. SCHNABEL.

Witnesses:
SAMUEL N. POND,
L. F. MCCREA.